(12) United States Patent
Wines

(10) Patent No.: US 11,437,755 B2
(45) Date of Patent: Sep. 6, 2022

(54) CONTROLLER AND SYSTEM

(71) Applicant: Home Theater Direct, Inc., Plano, TX (US)

(72) Inventor: Brian R. Wines, Allen, TX (US)

(73) Assignee: HOME THEATER DIRECT, INC., Plano, TX (US)

( * ) Notice: Subject to any disclaimer, the term of this patent is extended or adjusted under 35 U.S.C. 154(b) by 266 days.

(21) Appl. No.: 16/599,238

(22) Filed: Oct. 11, 2019

(65) Prior Publication Data

US 2021/0111511 A1  Apr. 15, 2021

(51) Int. Cl.
| | |
|---|---|
| *H01R 13/62* | (2006.01) |
| *H04B 1/3818* | (2015.01) |
| *G06K 13/08* | (2006.01) |
| *H01R 11/30* | (2006.01) |
| *H04L 49/1515* | (2022.01) |
| *A45C 11/00* | (2006.01) |

(52) U.S. Cl.
CPC ..... *H01R 13/6205* (2013.01); *G06K 13/0831* (2013.01); *H01R 11/30* (2013.01); *H04B 1/3818* (2015.01); *H04L 49/1523* (2013.01); *A45C 2011/003* (2013.01)

(58) Field of Classification Search
CPC .. H01R 13/6205; H01R 11/30; H04B 1/3818; H04B 49/1523
USPC .......................................................... 439/39
See application file for complete search history.

(56) References Cited

U.S. PATENT DOCUMENTS

| | | | |
|---|---|---|---|
| 3,706,882 A * | 12/1972 | Eby | .......................... B60Q 1/18 |
| | | | 362/398 |
| 4,058,357 A * | 11/1977 | Wallace | .............. B60R 11/0205 |
| | | | 439/40 |
| 4,156,265 A | 5/1979 | Rose | |
| 4,318,159 A | 3/1982 | Kaisner | |
| 4,449,168 A | 5/1984 | Ewing | |
| D285,066 S | 8/1986 | Liss et al. | |
| D294,566 S | 3/1988 | Boytor | |

(Continued)

FOREIGN PATENT DOCUMENTS

KR   100 541 561   1/2006

OTHER PUBLICATIONS

U.S. Appl. No. 60/715,330, filed Sep. 2005, M. S. Farmer.
(Continued)

*Primary Examiner* — Alexander Gilman
(74) *Attorney, Agent, or Firm* — Baker Botts, LLP

(57) ABSTRACT

According to one embodiment, a controller may include a user interface that is operable to receive input from a user to control an electronic system to which the controller may be coupled either directly or indirectly. The user interface may comprise an interface housing to which the user interface is coupled, the interface housing having a front portion and a rear portion, the front portion of which may contain the user interface. A controller housing may be coupled to the rear portion of the interface housing, the controller housing having a smaller perimeter than the interface housing. The controller housing may be comprised of at least one sidewall and a rear wall. At least one magnet may be coupled to the controller housing. The magnet(s) may be operable to hold the controller in position using magnetic force when the controller housing is inserted into a mounting receptacle.

21 Claims, 6 Drawing Sheets

(56) References Cited

U.S. PATENT DOCUMENTS

| | | | |
|---|---|---|---|
| 5,015,829 A | 5/1991 | Eilert et al. | |
| D327,255 S | 6/1992 | D'Aleo et al. | |
| 5,237,327 A * | 8/1993 | Saitoh | H01H 9/0235 341/176 |
| 5,306,156 A * | 4/1994 | Gibbs | B60Q 1/302 224/315 |
| 5,458,311 A * | 10/1995 | Holbrook | H05B 47/10 248/309.1 |
| D365,329 S | 12/1995 | Seymour et al. | |
| D378,814 S | 4/1997 | Adams et al. | |
| D380,737 S | 7/1997 | Weir et al. | |
| D381,590 S | 7/1997 | Thoeni et al. | |
| D390,211 S | 2/1998 | Yates et al. | |
| D400,539 S | 11/1998 | Hipen | |
| D404,391 S | 1/1999 | Herbstritt et al. | |
| D406,830 S | 3/1999 | Herbstritt et al. | |
| 5,943,208 A * | 8/1999 | Kato | G06F 1/184 248/222.11 |
| D413,867 S | 9/1999 | Mullet et al. | |
| D416,910 S | 11/1999 | Vasquez | |
| D423,508 S | 4/2000 | Nakajima | |
| 6,103,974 A | 8/2000 | Erdfarb | |
| 6,114,637 A | 9/2000 | Nakao et al. | |
| D449,789 S | 10/2001 | Gunji et al. | |
| 6,322,232 B1 | 11/2001 | Oliver | |
| D451,529 S | 12/2001 | Vasquez | |
| 6,369,322 B1 | 4/2002 | Gretz | |
| D457,502 S | 5/2002 | Sykes et al. | |
| D464,328 S | 10/2002 | Vasquez et al. | |
| D464,948 S | 10/2002 | Vasquez et al. | |
| 6,653,566 B2 | 11/2003 | Petak et al. | |
| D494,176 S | 8/2004 | Porter et al. | |
| D494,182 S | 8/2004 | Singer et al. | |
| D502,466 S | 3/2005 | Aupperle | |
| D505,676 S | 5/2005 | Porter et al. | |
| 6,923,551 B2 | 8/2005 | Galli | |
| 6,956,169 B1 | 10/2005 | Shotey et al. | |
| 6,957,962 B2 * | 10/2005 | Tomino | H01R 9/16 248/206.5 |
| 6,994,305 B2 * | 2/2006 | Schenk, Jr. | B25B 11/002 248/205.1 |
| D520,495 S | 5/2006 | Dukerschein et al. | |
| 7,038,132 B1 | 5/2006 | Lowe et al. | |
| 7,129,412 B2 | 10/2006 | Pierce | |
| D537,417 S | 2/2007 | Dukerschein et al. | |
| 7,179,996 B1 | 2/2007 | Britt et al. | |
| 7,230,182 B1 | 6/2007 | Gates | |
| 7,247,794 B1 | 7/2007 | Johnson et al. | |
| D549,710 S | 8/2007 | Hynecek et al. | |
| 7,367,131 B1 * | 5/2008 | Hordis | H02G 3/12 33/528 |
| 7,374,142 B2 * | 5/2008 | Carnevali | F16M 13/00 224/183 |
| D571,675 S | 6/2008 | Skaf | |
| 7,414,193 B1 * | 8/2008 | Le | H05K 5/0204 174/50 |
| D581,879 S | 12/2008 | Dukerschein | |
| D584,240 S | 1/2009 | Skaf | |
| D587,261 S | 2/2009 | Skaf | |
| D599,801 S | 9/2009 | Skaf | |
| D616,321 S | 5/2010 | Skaf | |
| 7,726,974 B2 | 6/2010 | Shah | |
| 7,786,623 B2 | 8/2010 | Farmer | |
| 7,789,526 B2 | 9/2010 | Gibbons | |
| 8,454,204 B1 | 6/2013 | Chang | |
| 9,151,453 B2 * | 10/2015 | Holland | F21K 9/20 |
| 9,310,020 B1 | 4/2016 | Bernards | |
| 9,318,886 B1 * | 4/2016 | Pate | H01R 11/30 |
| 9,369,790 B2 * | 6/2016 | Schreiber | H04R 1/08 |
| 9,614,322 B1 * | 4/2017 | Gibboney, Jr. | H01R 13/64 |
| 9,711,957 B2 * | 7/2017 | Trojanowski | H02G 3/14 |
| 9,728,947 B2 * | 8/2017 | Trojanowski | H02G 3/14 |
| 9,841,155 B2 * | 12/2017 | Rao | F21S 9/022 |
| 10,493,901 B2 * | 12/2019 | Schermerhorn | F21S 43/40 |
| 2004/0190239 A1 | 9/2004 | Weng et al. | |
| 2005/0045784 A1 * | 3/2005 | Pitlor | H02G 3/20 248/206.5 |
| 2007/0183138 A1 | 8/2007 | Cooper | |
| 2008/0078903 A1 | 4/2008 | Struthers | |
| 2008/0258644 A1 * | 10/2008 | Altonen | H05B 39/085 315/246 |
| 2009/0193724 A1 * | 8/2009 | Struthers | H04R 1/025 52/27 |
| 2015/0144754 A1 * | 5/2015 | Elharar | F16M 13/02 248/230.8 |
| 2016/0040825 A1 * | 2/2016 | Franklin | F16B 1/00 439/39 |
| 2016/0246328 A1 * | 8/2016 | Christie, II | F16M 13/02 |
| 2018/0000240 A1 * | 1/2018 | Yamamoto | A47B 9/00 |
| 2018/0206631 A1 * | 7/2018 | Bryans | A47B 21/06 |
| 2019/0229478 A1 * | 7/2019 | Iaconis | H04N 5/2257 |

OTHER PUBLICATIONS

PCT Notification of Transmittal of the International Search Report and the Written Opinion of the International Searching Authority, or the Declaration; Jan. 20, 2021; Int'l application No. PCT/US2020/054372; 21 pages.

* cited by examiner

CONTROLLER AND SYSTEM

TECHNICAL FIELD

This disclosure relates in general to controllers and more particularly to controllers that are easy to install or uninstall.

BACKGROUND

In virtually any environment, a variety of controllers axe used to control various electronic systems. Controllers are used in offices, factories, and the home to control one or more electronic devices in same manner. Examples of electronic systems using controllers include HVAC systems, televisions or other video systems, audio systems, security systems, lighting systems, intercom systems, automated manufacturing equipment, etc. In some circumstances, controllers are dedicated to a particular function and in other cases, controllers may perform multiple functions.

Often, various electronic systems are added to the interior or exterior of a building after the building has already been constructed. In addition, in a factory environment, electronic systems may be added to automated manufacturing equipment after that equipment has been installed. Systems that are added after construction may require installation of one or more controllers for those systems. Installing new controllers may be time consuming and may be challenging fox non-professional installers to install without damaging the aesthetics of the environment in which the controller is installed.

Where new construction is concerned, the ease of installation for a controller may affect the cost of construction as well as the overall desirability of the aesthetics of that installation.

In some cases, controllers are a significant cost item when compared to the overall cost of the system being controlled. While one may wish to control a system from many different locations, the cost of having a controller in each location may be prohibitive. For example, if one desires to be able to control the temperature while present in any room in a house, it may be undesirable for cost reasons to install a thermostat in every room in the house.

SUMMARY OF THE DISCLOSURE

According to one embodiment, a controller may include a user interface that is operable to receive input from a user to control an electronic system to which the controller may be coupled either directly or indirectly. The user interface may comprise an interface housing to which the user interface is coupled, the interface housing having a front portion and a rear portion, the front portion of which may contain the user interface. A controller housing may be coupled to the rear portion of the interface housing, the controller housing having a smaller perimeter than the interface housing. The controller housing may be comprised of at least one sidewall and a rear wall. At least one magnet may be coupled to the controller housing. The magnet(s) may be operable to hold the controller in position using magnetic force when the controller housing is inserted into a mounting receptacle.

Technical advantages of certain embodiments may include the ease of installation of the controller. The controller may also be easy to uninstall due to the nature of how it is affixed to a mounting receptacle. In addition, the controller of the invention may create an aesthetically pleasing design when mounted on a wall or on a piece of furniture as the controller can be mounted without screws, nails, or other fasteners appearing on the visible front portion of the user interface. The controller may aesthetically blend more seamlessly with the surface on which it is installed. The installation may be faster than other installation techniques, thus reducing the cost of installation. Because installation is easier, less skill is required on the part of the person performing the installation than for other types of controllers. In addition, as compared to existing solutions, an unskilled installer may more easily achieve a flush appearance with the surface a contoller is installed against by using a controller as described herein. An unskilled installer can easily slide the described controller into an installation receptacle until it is flush with the surface it is installed into. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1:
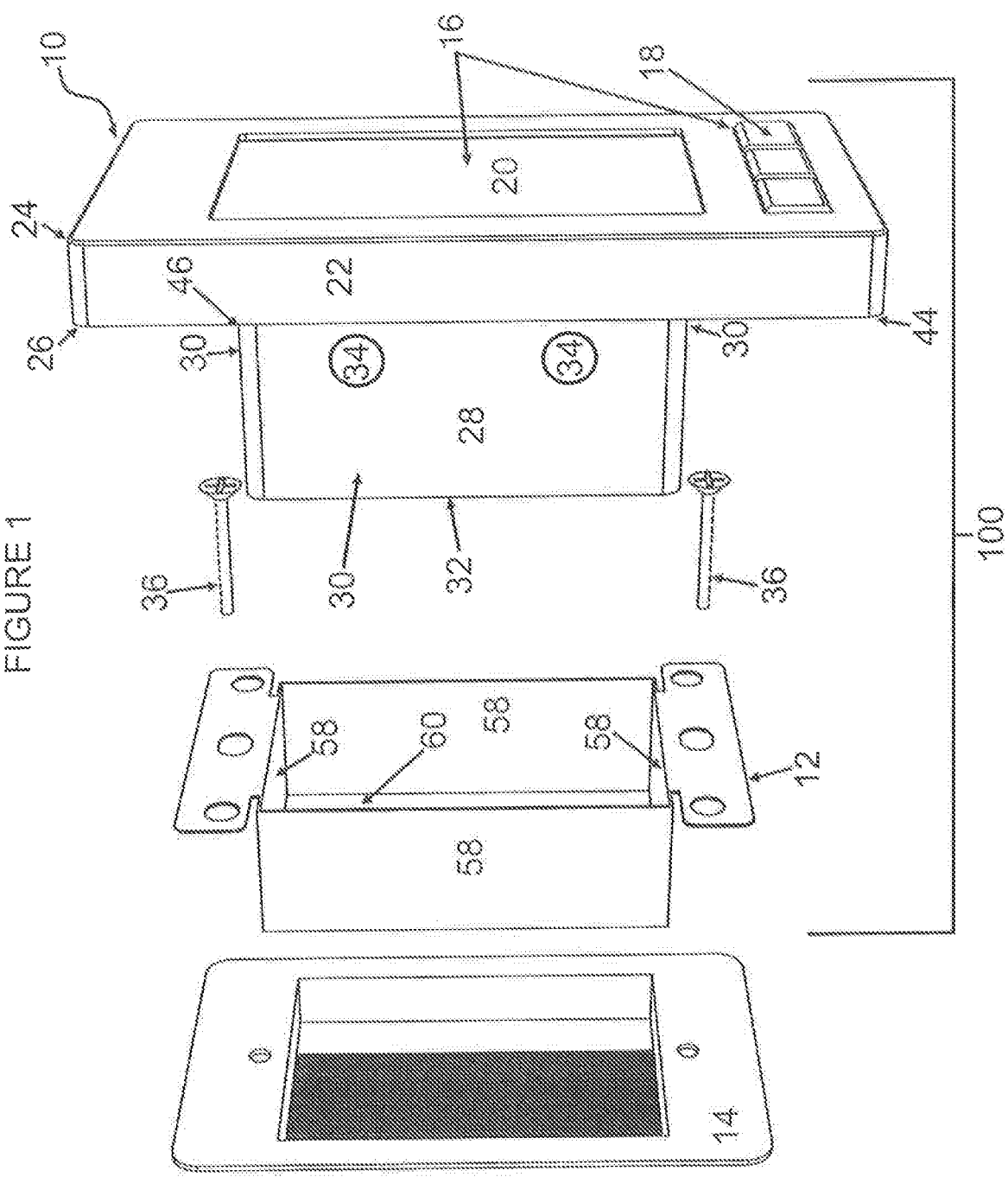
FIG. 1 illustrates a controller system, according to certain embodiments.

FIG. 1 illustrates a controller system 100 in accordance with one embodiment. Controller system 100 comprises controller 10 and mounting receptacle 12. Mounting receptacle 12 may be coupled to low voltage mounting bracket 14, either directly or indirectly. A low voltage mounting bracket 14 could be used for installation in many different structures but is typically used for installation on a wall, floor, or ceiling of a building or into a countertop of a building. In this embodiment, controller 10 may be installed by inserting it into mounting receptacle 12. Magnetic force holds controller 10 in position. Controller 10 may be uninstalled by pulling with sufficient force to overcome the magnetic force holding it in place.

Controller 30 comprises an electronic controller for controlling some portion of an electronic system such as an HVAC system, a television or other video system, an audio system, a security system, a lighting system, an intercom system, an automated manufacturing system, etc. In some embodiments, controller 10 may control multiple types of systems. Controller 10 is a digital controller in this embodiment but could be an analog controller.

Controller 10 may include a user interface 16. In this embodiment, user interface 16 may receive input from and provide output to a user of controller 10. User interface 16 may, however, only receive input from a user or only provide output to a user without departing from the scope of the disclosure. In this embodiment, user interface 16 comprises a keypad 18 with three keys and a touchscreen 20 that can receive input from and provide output to the user. User interface 16 is coupled to and may be contained within a user interface housing 22. Front portion 24 of user interface housing 22 is where the user interface 16 is located while rear portion 26 of user interface housing 22 may be coupled to controller housing 26.

Controller 10 further comprises controller housing 28. Controller housing 28 may house electronics that control and/or interface with user interface 16, either directly or indirectly. Controller housing 28 may also house conductors that connect wires and/or cables external to controller 10, either directly or indirectly to any electronics that are a part of controller 10, including without limitation user interface 16. Controller 10 may also be a hollow box. In some embodiments, the electronics that interface with user interface 16 will be contained within user interface housing 22.

Controller 10 may desirably be installed on a wall, floor or ceiling of any building such as a house or business, into the chassis of a piece of manufacturing equipment, into a countertop, into the surface of a piece of furniture such as a desk, etc. To make controller 10 easier to install and uninstall, it is desirable for controller housing 28 to have a smaller perimeter than the user interface housing 22. Put another way, the controller housing 28 has a smaller footprint than the user interface housing 22. Typically, the largest outer perimeter of the controller housing will be smaller than the smallest outer perimeter of the user interface housing. Neither housing need have a constant perimeter.

In this embodiment, controller housing 28 comprises one or more sidewalls 30 and a rear wall 32. As illustrated, the corners where sidewalls 30 come together may be rounded but also could be slanted or sharp. Any transition between sidewalls 30 could be used.

In this embodiment, one or more magnets 34 may be coupled to controller 10. Magnets 34 may supply a magnetic force to hold controller 10 in place once it is inserted within a mounting receptacle. In the illustrated embodiment, two magnets are included on opposing sidewalls 30 of controller housing 28. As will be discussed further below, one or more magnets 34 may be placed anywhere on the exterior or in the interior of controller housing 28 without departing from the scope of the disclosure. Here, one or more magnets 34 are glued to the exterior of controller housing 28 but magnets 34 could be attached in different ways including via other adhesives, mechanical forms of attachment, and/or via magnetic force.

In the illustrated embodiment, mounting receptacle 12 is made of a ferromagnetic metal, such as steel. However, as discussed in more detail below, mounting receptacle 12 need not be made of a ferromagnetic material or even made of metal at all. Mounting receptacle 12 may be a metal ring, such as a metal ring commonly used by electricians. While mounting receptacle 12 can be a metal ring, it need not be made of metal. Mounting receptacle 12 may hold controller 10 in place when controller 10 is inserted into mounting receptacle 12. For example, mounting receptacle 12 may be a metal ring which holds controller 10 in place via magnetic force supplied by one or more magnets 34. As will be discussed below, the fact that magnetic force holds controller 10 in place does not rule out other forces (e.g. gravity and/or mechanical force) from assisting to hold controller 10 in place.

In the illustrated embodiment, mounting receptacle 12 may be affixed to low voltage mounting bracket 14 using machine screws 36. Machine screws 36 may be inserted through holes in the upper and lower tabs in mounting receptacle 12. The tabs may be omitted without departing from the scope of the disclosure. Low voltage mounting bracket 14 typically includes threaded holes in it to which machine screws 36 may be attached. If a threaded hole is not provided in low voltage mounting bracket 14, any other way of coupling mounting receptacle 12 to low voltage mounting bracket 14 may be used, including, for example, using machine screws, drywall screws (with or without anchors), nails, glue, another adhesive, hook and loop fasteners, etc.

This embodiment allows controller 10 to be easily installed and uninstalled from mounting receptacle 12 because of the use of magnetic force to couple controller 10 to mounting receptacle 12. In addition, controller 10 may provide an aesthetically pleasing appearance because of the way it is installed. In some embodiments, a user may desire to move controller 10 to different rooms in a building or to different locations within the same room for various reasons. Because magnetic force is used to hold controller 10 in place, controller 10 may be easily uninstalled to move to a second location and installed in that second location. Moving controller 10 from one location to another may be accomplished without tools in most instances, saving time and hassle for the user.

Figure 2:
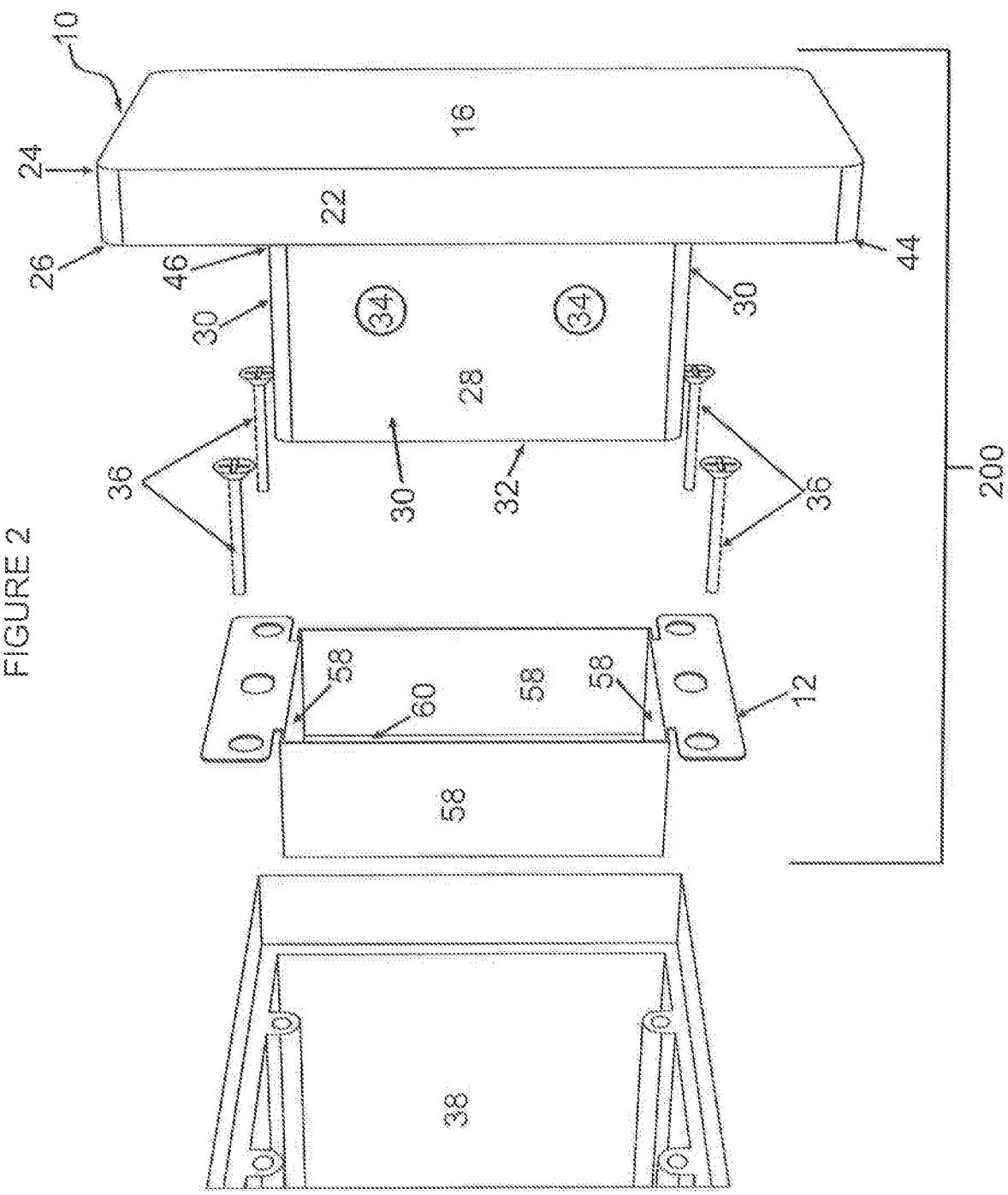
FIG. 2 illustrates another example controller system, according to certain embodiments.

FIG. 2 illustrates a controller system 200 in accordance with one embodiment. Controller system 200 is similar to controller system 100, except that here, mounting receptacle 12 may be coupled, directly or indirectly, to electrical junction boy 36. In some embodiments, junction box 38 may be a single-gang or double-gang electrical junction box. For a single-gang electrical junction box, mounting receptacle 12 may be coupled, directly or indirectly, to the single-gang electrical junction box in the same manner in which mounting receptacle 12 can be coupled to low voltage mounting bracket 14 in FIG. 1. Typically, when attaching mounting receptacle 12 to a single-gang electrical junction box, the center hole in the tabs of mounting receptacle 12 may be used as these would most often line up with threaded holes in a single-gang electrical junction box. Typically, when attaching mounting receptacle 12 to a double-gang electrical junction box, the outer holes in the tabs of mounting receptacle 12 may be used as these would most often line up with threaded holes in a double-gang electrical junction box. (Note that all of the options for mounting receptacle 12 discussed above and below are applicable to this embodiment as well.) In the illustrated embodiment junction box 38 is a double-gang electrical junction box.

In the illustrated embodiment of FIG. 2, mounting receptacle 12 may be affixed to junction box 38 using machine screws 36. Machine screws 36 may be inserted through holes in the upper and lower tabs in mounting receptacle 12. The tabs may be omitted without departing from the scope of the disclosure. junction box 38 typically includes threaded holes in it to which machine screws 36 may be attached. If threaded holes are not provided in junction box 38, then any other way of coupling mounting receptacle 12 to junction box 38 may be used, including, for example, using sheet metal screws, drywall screws (with or without anchors), nails, glue, another adhesive, hook and loop fasteners, etc.

Figure 3:
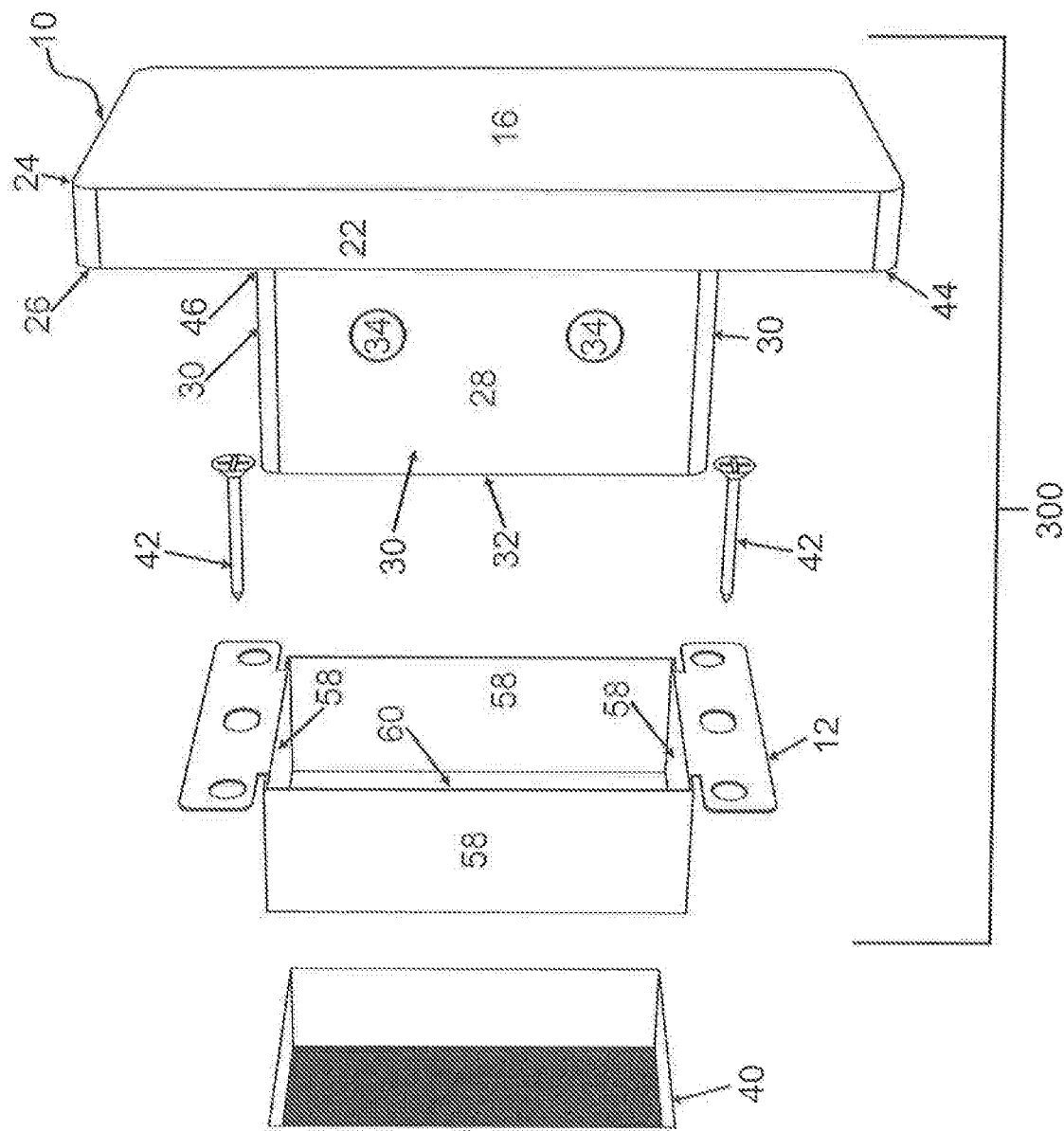
FIG. 3 illustrates another example controller system, according to certain embodiments.

FIG. 3 illustrates a controller system 300 in accordance with one embodiment. Controller system 300 is similar to controller systems 100 and 200, except that here, mounting receptacle 12 may be coupled, directly or indirectly, to holed mounting surface 40. It may be desirable to mount mounting receptacle 12 into a countertop, into a piece of furniture, etc.

without using a low voltage mounting bracket or junction box. In such case, an opening can be cut to receive controller housing 28. Mounting receptacle 12 can then be attached to holed mounting surface 40 adjacent to the hole. (Note that all of the options for mounting receptacle 12 discussed above and below are applicable to this embodiment as well.)

In the illustrated embodiment of FIG. 3, mounting receptacle 12 may be affixed to holed mounting surface 40 using screws 42. Screws 42 may be inserted into holes in the upper and lower tabs in mounting receptacle 12. The tabs may re omitted without departing from the scope of the disclosure. Holed mounting surface 40 may include pilot holes to receive the screws or the screws may be screwed into the surface directly. Any other way of coupling mounting receptacle 12 to holed mounting surface 40 may be used, including, for example, using sheet metal screws, drywall screws (with or without anchors), nails, glue, another adhesive, hook and loop fasteners, etc.

Note that for all of the embodiments discussed herein the mounting receptacle may be coupled to another structure using one or more additional mounting brackets or intermediate structures.

FIGS. 1-3 illustrate three different ways in which controller 10 may be installed. In operation, controller 30 may be installed as follows. Typically, mounting receptacle 12 (and any variations thereof discussed herein) may first be affixed (using machine screws or sheet metal screws or any of the options discussed herein) to low voltage mounting bracket 14, junction box 38, or holed mounting surface 40. Optionally, cables or wires that are to pass through mounting receptacle 12 may be passed into the interior of mounting receptacle 12 either before or after mounting receptacle 12 has been affixed to low voltage mounting bracket 14, junction box 38 or holed mounting surface 40. Any cables or wires that are to be attached to controller 10 may then be attached to controller 10. Controller 10 can then be installed by sliding controller 10 into mounting receptacle 12, where magnetic force holds controller 10 in place within mounting receptacle 12. Of course, other forces may aid in holding controller 10 in place. For example, gravity may help hold controller 10 in place. Friction may also aid in holding controller 10 in place, particularly where portions of controller housing 28 rest against portions of mounting receptacle 12. Controller 10 is still being held in place by magnetic force where magnetic force is contributing to holding controller 10 in place.

To uninstall controller 10, it can be pulled out of mounting receptacle 12 with sufficient force to overcome the magnetic force (and/or other forces mentioned herein that may contribute to holding controller 10 in place) otherwise holding controller 10 in place. After controller 10 has been partially or completely removed from mounting receptacle 12, any cables or wires attached to controller 10 may be disconnected.

In the illustrated embodiments, for aesthetic purposes, user interface housing 22 extends about 13/16 of an inch above and below controller housing 28, and extends about 7/16 of an inch to the right and left of controller housing 28. In other words, the outer perimeter of user interface housing 22 is greater than the largest outer perimeter of controller housing 28. The user interface housing 22 can thus be said to have a larger footprint than the controller housing 28—meaning that each edge of user interface housing 22 protrudes beyond a corresponding edge of controller housing 28. In most embodiments, controller housing 28 is hidden from view by user interface housing 22 when user interface housing 22 is viewed directly from the front of user interface housing 22. The above dimensions allow user interface housing 22 to cover mounting receptacle 12 when controller 10 is installed, thus providing a better aesthetic appearance. In some embodiments, user interface housing 22 may be dimensioned so that it will cover mounting receptacle 12 when mounting receptacle 12 is inserted into a standard low voltage mounting bracket, which typically has an approximate exterior dimension of 4.25×2.5 inches. It is desirable for the back edge 44 of user interface housing 22 to extend at least ¼ inch, more desirably, at least ½ inch, and even more desirably at least ⅞ inch beyond the front edge 44 of controller housing 28.

While controller housing 28 is centered vis a vis user interface housing 22 both top to bottom and side to side, controller housing 28 could be asymmetrically positioned vis a vis user interface housing 22 without departing from the scope of the invention. It is desirable in such a configuration for user interface housing 22 to be sufficiently large that it hides mounting receptacle 12 when controller 10 is installed within mounting receptacle 12.

In the embodiments illustrated in FIGS. 1-5, mounting receptacle 12 may be affixed to junction box 38, low voltage mounting bracket 14, and/or holed mounting surface 40 using machine screws or sheet metal screws. However, other methods could be used to attach mounting receptacle 12 to junction box 38, low voltage mounting bracket 14, and/or holed mounting surface 40 without departing from the scope of the invention such as, for example, using nails, an adhesive, tape, hook and loop fasteners, tabs engaging slots, and/or snap lock fasteners. Note that one or more washers and/or lock washers may be used with machine screws or sheet metal screws without departing from the scope of the invention. In addition attachment may be direct or indirect and employ additional brackets or other structures.

Figure 4:
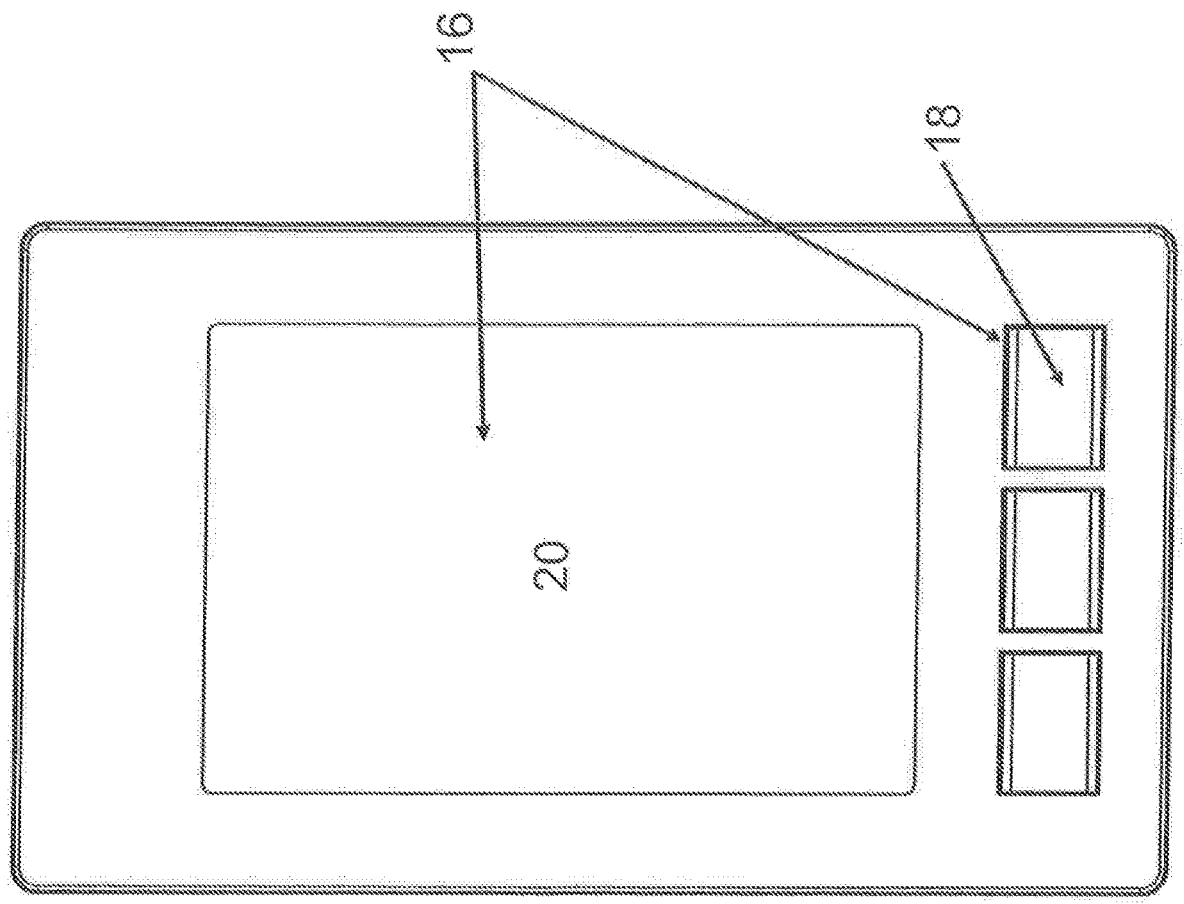
FIG. 4 illustrates an example back portion of a controller according to certain embodiments.

FIG. 4 illustrates a front portion of an example embodiment of controller 10. In this embodiment, controller 10 has a user interface 16 with a keypad 18 and a touchscreen 20. The touchscreen 20 may receive input from and/or provide information to a user. Any user interface 16 may be used without departing from the scope of the disclosure. Some options for user interface 16 are discussed below. Note that user interface 16 may also include or comprise one or more microphones, cameras, and/or speakers. In some embodiments, a fingerprint scanner and/or retinal scanner may also be included or may serve as user interface 16.

Figure 5:
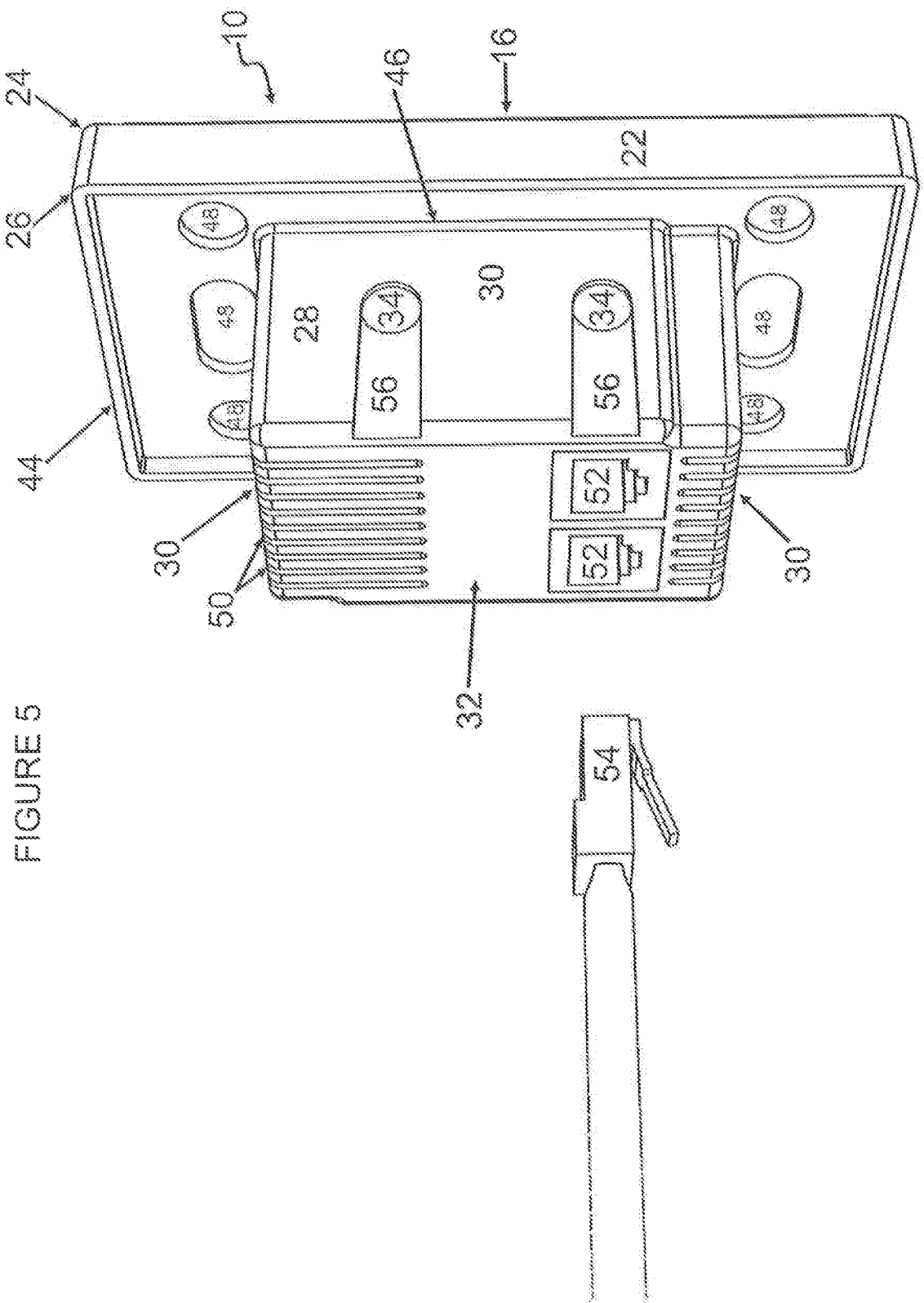
FIG. 5 illustrates an example user interface of a controller according to certain embodiments.

FIG. 5 illustrates a perspective view of the rear portion of an example embodiment of controller 10. In this embodiment, the rear of user interface housing 22 comprises a plurality of openings 48. Where machine screws and/or sheet metal screws are used to attach mounting receptacle 12 to a low voltage mounting bracket, electrical junction box, or another surface, the screw heads may rest inside the openings 48. This allows user interface housing 22 to rest closer to the surface on which controller 10 is installed. The use of the structures describes herein may also allow for the thickness of interface housing 22 to be reduced because existing mounting methods often result in extra thickness to various housings to allow an installer to gain access to a mounting location.

While the rear of controller housing 28 is generally closed, a plurality of ventilation openings 50 may be provided to exhaust heat generated inside of controller housing 28. In this embodiment, controller housing 28 also has a two connector ports 52 configured to receive a data communication cable connector 54. Connector ports 52 could also be ports for receiving or supplying power and power may also be supplied or received through connector ports 52 that are used for data communication. While the illustrated embodiment has connector ports 52 for Cat5 or Cat6 cables, any type of connector ports 52 could be used as is further discussed below. In some embodiments, connector ports 52 may be omitted.

In some embodiments, controller housing 28 may include one or more recessed channels 56. Recessed channels 56 may simplify manufacturing of controller 10 by indicating an approximate position of where one or more magnets 34 may be coupled to controller housing 28.

In the embodiments of FIGS. 1-5, mounting receptacle 12 is constructed, at least partially, of a ferromagnetic metal so that magnets will be attracted to the mounting receptacle 12. In other embodiments, mounting receptacle 12 may be made of non-ferromagnetic metal or of non-metal such as plastic. In such embodiments, a piece of ferromagnetic material could be coupled (either directly or indirectly to mounting receptacle 12 to support magnetic coupling between mounting receptacle 12 and one or more magnets coupled to controller 10. For example, ferromagnetic plates could be attached to the inside or outside of sidewalls 58 or back wall 60 of mounting receptacle 12. While such plates would typically be attached to the inside sidewalls 58 or back wall 60, if the magnets on controller 10 were particularly strong, they could be attached to the outside of the sidewalls 58 or back wall 60 so as to reduce the amount of force necessary to separate controller 10 from mounting receptacle 12.

Where the amount of force necessary to separate controller 10 from mounting receptacle 12 presents potential problems because the force is too strong, ferromagnetic plates could be positioned such that they are offset from the position of the magnets on the controller, thus reducing the magnetic force between the plates and the magnets. In other embodiments, (whether ferromagnetic plates are used or whether the mounting receptacle 12 is ferromagnetic itself), the magnets can be made adjustable so that they can touch the surface of mounting receptacle 12 that they will mate with or remain a distance from such surface. The magnets may be adjustable, for example, using a bolt type apparatus to move the magnets an adjustable distance to or from the sidewalls of the controller housing 28. In some embodiments, the controller housing 28 may have recesses or holes in the housing into which the magnets may be withdrawn partially or completely. Such adjustment may affect the amount of force that it takes to break the magnetic bond between the magnets and the mounting receptacle 12.

In the embodiments illustrated in FIGS. 1-3, mounting receptacle 12 has a back wall 60. Back wall 60 may be omitted without departing from the scope of the invention. Back wall 60 may have one or more openings in it—such openings may be used for ventilation, to allow one or more wires or cables to pass through the openings to be connected to controller 10, or both. Back wall 60 may also have no openings in it, or may be a partial wall. Where mounting receptacle 12 is a metal ring, back wall 60 would typically be omitted.

In the embodiments illustrated in FIGS. 1-3, controller housing 28 is a separate piece from user interface housing 22 during manufacturing. These pieces may be joined together during manufacturing of controller 10 using any known technique such as by using glue, other adhesives, screws, rivets, tabs, or fasteners. However, controller housing 28 and user interface housing 22 could be a single piece without departing from the scope of the invention. For example, controller housing 28 and user interface housing 22 could be a single molded piece. Controller housing 29 could also be comprised of multiple pieces connected and/or coupled together. User interface housing 22 could also be comprised of multiple pieces connected and/or coupled together.

In the embodiments illustrated in FIGS. 1-3, controller housing 29 is shaped like a generally rectangular box with flattened corners. Controller housing 28, however, could be any shape without departing from the scope of the invention. Controller housing 28 has at least one sidewall. If controller housing 28 were, for example, circular and/or elliptical in shape, it could have only a single sidewall. Controller housing 28 may have any number of sidewalls without departing from the scope of the invention.

In some embodiments, controller housing 28 itself may be constructed of a ferromagnetic material. In such embodiments, magnets say simply be stuck onto the sidewalls 30 or rear wall 32 of controller housing 28. In those embodiments, the position of the magnets could be adjusted simply be moving them around on the surface of one or more of the sidewalls or the surface of one or more of the rear walls. The same effect could be achieved by mounting ferromagnetic material on the inside or outside of the sidewalls 30 and/or rear wall 32 of controller housing 28.

In some embodiments, to increase magnetic force, magnets of opposite polarity may be coupled to both controller housing 28 and mounting receptacle 12. All of the options discussed herein are equally applicable to such an embodiment. Controller housing 28 may be made of a ferromagnetic material or a material that is not ferromagnetic. Mounting receptacle 12 may be made of a ferromagnetic material or a material that is not ferromagnetic (which may or may not be metal). The magnets of opposite polarity may be coupled, respectively, to controller housing 28 and mounting receptacle 12 either through direct connection or otherwise. Coupling of the magnets may be accomplished using glue or another adhesive, slots, tabs, or other mechanical connection. The magnets may be adjustable on controller housing 28, mounting receptacle 12, or both. For example, the magnets could be attached to a bolt like shaft that could be screwed in or out to adjust the height of the magnets. The magnets could also protrude from or be recessed into controller housing 28, mounting receptacle 12, or both.

Figure 6:
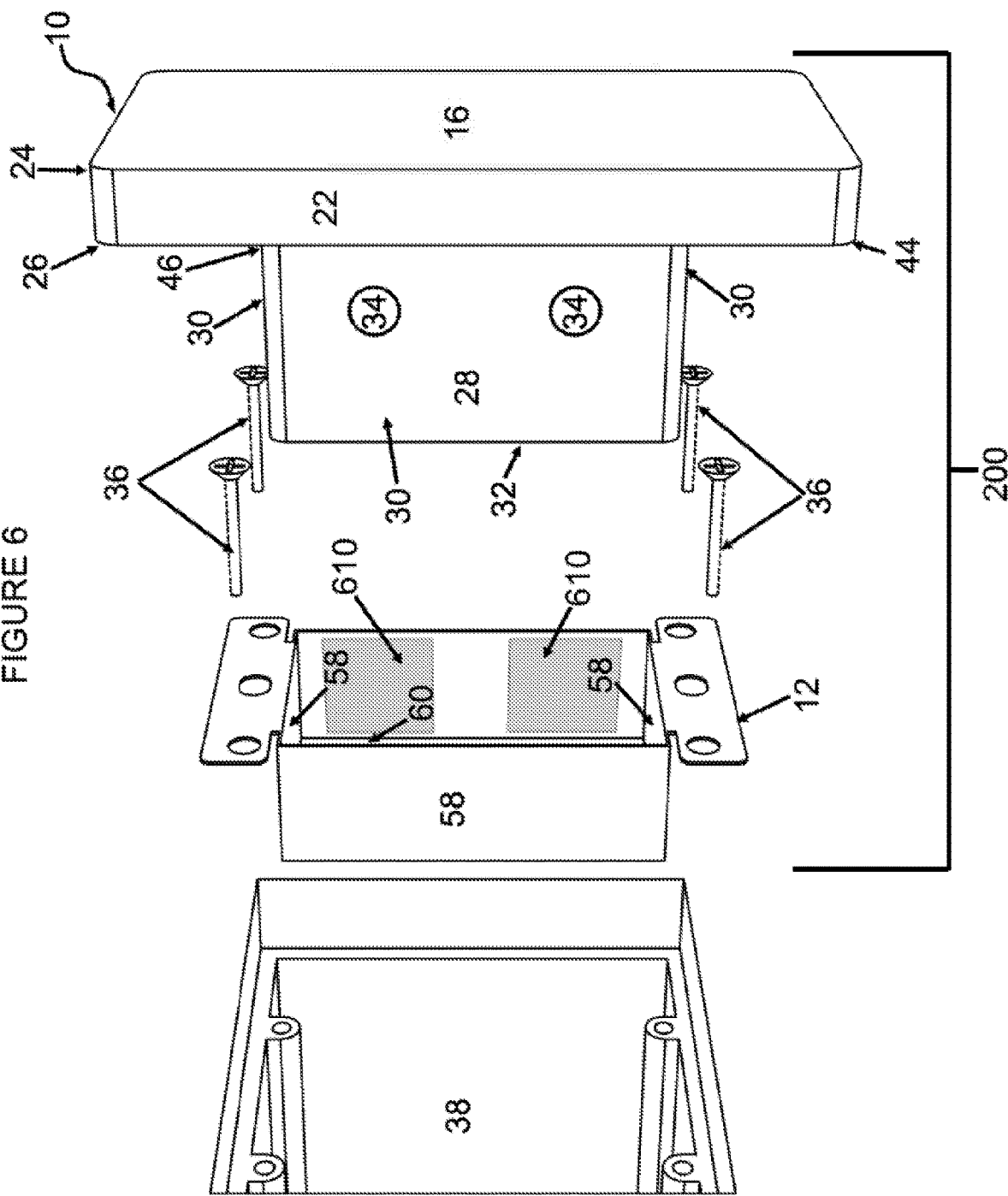
FIG. 6 illustrates another example controller system, according to certain embodiments.

FIG. 6 illustrates another example controller system, according to certain embodiments. In this embodiment, squares 610 represent material that engages magnetically with one or more magnets as discussed above. Squares 610 may represent magnets or ferromagnetic plates coupled to mounting receptacle 12. As discussed herein, ferromagnetic plates could be attached to the outer or inner surface of sidewalls 58 of mounting receptacle 12. As further discussed herein, magnets of opposite polarity to those on the controller housing could be coupled to the mounting receptacle 12.

In the embodiments illustrated in FIGS. 1-5 the magnets 34 are neodymium magnets. However, other types of magnets may be used without departing from the scope of the invention. The magnets may be any shape or size without departing from the scope of the invention. Magnets 34 may be made larger or smaller or more or less magnets may be used to vary the magnetic force between the magnets 34 and mounting receptacle 12. In some embodiments, magnets 34 could be a single magnet. For example a single magnet could be used where the magnet is a thin sheet. If the magnet is flexible, a thin sheet might wrap around multiple sides of controller housing 28.

In the embodiments illustrated in FIGS. 1-5, the rear wall 32 of controller housing 28 has at least one connector port 52 configured to receive a data communication cable connector. Rear wall 32 may have any number (including zero) of connector ports 52 without departing from the scope of the invention.

In the embodiments illustrated in FIGS. 1-5, the connector ports 52 comprise CAT5 and/or CAT6 connector ports. However, any kind of connector ports could be used without departing from the scope of the invention such as, for example, CAT3, CAT7, CAT5, fiber optic, and/or coaxial cable connector ports. In some embodiments, controller 10 may be coupled to the system it is designed to control using fiber optic cables rather than through conductive data transmission cables such as a CAT5 or CAT6 cable. A connector port could also be included to supply power to controller 10.

In some embodiments, controller 10 may control the system it is designed to control using a wireless link, such as a Bluetooth wireless link. In such an embodiment, connector ports 52 may be omitted. However, connector ports 52 still could be included where some type of wireless link is present either for the purpose of supplying power to controller 10 and/or to provide an alternative method of data communication to be used in case the wireless link is not functional or does not work in an optimal manner.

In the embodiments illustrated in FIGS. 1-5, user interface 16 comprises a touchscreen 20 and a keypad 18 with a plurality of keys. Each key on the keypad is a switch for which the open or closed position of the switch may cause the controller to perform a particular function. As such, user interface 16 both receives input from a user and can be used to provide output to the User that is relevant to the use of the controller 10. However, a user interface 16 made in accordance with the invention need not both receive input from and provide output to the user. Instead, user interface 16 could perform only input functions or perform only output functions.

While in the embodiments illustrated in FIGS. 1-5, user interface 16 comprises a touchscreen, any type of electronic output device could be used to provide output to a user of controller 10. Examples in addition to a touchscreen include an active matrix display, LED display, OLED display, LCD display, plasma display, FLCD display, VFD display, AMO-LED display, IPS-LCD display, electroluminescent display, Gyricon display, and/or E-Ink display, etc.

Similarly, while in the embodiments illustrated in FIGS. 1-5, user interface 16 comprises a keypad 18 with multiple keys, keypad 18 could be omitted without departing from the scope of the invention. Moreover, keypad 18 may have one key or multiple keys. Also, in some embodiments, keypad 18 may have a single or multiple keys and no display or other output for the user. Keypad 18 could be a single switch.

In an alternative embodiment (not explicitly shown), one or more magnets 34 could be coupled to mounting receptacle 12 using glue or some mechanical means of attachment. Coupling of the magnets may be direct or indirect. In such an embodiment, magnets 34 may desirably remain attached to mounting receptacle 12 when controller 10 is installed and/or uninstalled. A number of the options discussed above could be used with this embodiment as well.

For example, mounting receptacle 12 could be made of plastic or a metal that is not ferromagnetic. In addition, one or more ferromagnetic metal plates could be attached to mounting receptacle 12, for example using glue or some other adhesive. Those plates, as discussed above, could be attached to the inner or outer portion of the sidewalls 58 of mounting receptacle 12. Alternatively, where mounting receptacle 12 has a back wall 60, those plates could be attached to the inner or outer portion of the back wall 60 of mounting receptacle 12.

For purposes of attachment of the Controller via magnetic force in such an embodiment, controller housing 28 could be made of a ferromagnetic metal. Alternatively, controller housing 28 could be made of a material that is not ferromagnetic metal and ferromagnetic metal strips could be attached to the inner or outer portion of the sidewalls 30 of controller housing 28. Ferromagnetic metal strips could be attached to the inner or outer portions of the rear wall 32 of controller housing 28 as well.

As was discussed above, ferromagnetic metal strips could be attached using glue but could also be mechanically held in place using tabs, slots, sheet metal screws, machine screws, other types of fasteners or via pressure applied by molded pieces of the casing. Any method to keep the strips in place could be used. In addition, the ferromagnetic material associated with either the controller housing 28 or mounting receptacle 12 need not be strips. Any shape of ferromagnetic material could be used. For example, an inner housing inside or outside of the controller housing 28 or mounting receptacle 12 could be used.

In an embodiment where both mounting receptacle 12 and controller housing 28 have ferromagnetic material for causing controller 10 to be held in place in mounting receptacle 12, it may be desirable to position the ferromagnetic material in such a way so as to cause the magnetic force to be stronger for the controller housing 28 or mounting receptacle 12. If this is done, then the magnets would remain installed, in most cases, on the structure where the magnets apply the most magnetic force. To accomplish this, the magnets might be applied to ferromagnetic material directly for one of the pieces while ferromagnetic strips might be under a layer of plastic for the other piece. The ferromagnetic material might also be a smaller size for one of the pieces. In addition, the magnets might be mechanically prevented from directly contacting the ferromagnetic material due to their placement and the design of the controller housing 26 and/or mounting receptacle 12.

In another embodiment, (not explicitly shown), one or more magnets 34 may be coupled to user interface housing 22. These magnets could be coupled to the user interface housing (directly or indirectly) using glue or another adhesive, using mechanical means, and/or via magnetic force (if the user interface housing is made of, or has attached to it, ferromagnetic material). In such an embodiment, mounting receptacle 12 could be omitted and replaced with a picture frame like structure that is made of ferromagnetic material or has ferromagnetic material attached to it. The picture frame like structure could be attached using any of the mechanisms discussed above to an electrical junction box, low voltage mounting bracket, or other enclosure. When the controller 10 is attached to the picture frame like structure, one or more magnets 34 will cause the controller 10 to attach to the picture frame like structure via magnetic force.

In another embodiment (not explicitly shown) controller 10 might instead be replaced by a cable port device to provide a physical interface where various cables can be connected. The cable port device may have a front housing shaped like user interface housing 22 and a back housing shaped like controller housing 28. In other words, the difference between this embodiment and the one illustrated is that user interface 16 would be replaced by a panel with one or more connectors where various types of cables could be connected, such as, for example, all of the options discussed above for cables that could be connected to the back of controller housing 28. All of the options discussed above for any aspect of the embodiments discussed could be used with such an embodiment. Note that such an embodiment may also still have one or more connector ports on the back of the equivalent of controller housing 28 where one or more cables could be connected.

In some embodiments, user interface 16 and/or user interface housing 22 may be replaced by a dummy user interface or simply a faceplate of some kind which, may, for example, be a decorative plate. In the case where a user moves the controller from room to room, it may be desirable to have a dummy controller or an aesthetically pleasing space filling device to fill mounting receptacle 12 when the controller 10 is not installed. A dummy controller could have a glass faceplate that resembles user interface 16 in place of user interface 16/user interface housing 22. A space filling device could simply have a plastic, wood, metal, synthetic, and/or composite material faceplate that blocks the view of mounting receptacle 12 when installed. The space filling device and/or dummy controller can have all of the installation options presented herein with respect to controller 10. A space filling device and/or dummy controller can be structured like controller 10 but the electronics inside controller housing 28 can be omitted and a faceplate can replace user interface 16 and/or user interface housing 22. In some embodiments, the faceplate could be inserted into user interface housing 22. In some embodiments, the space filling device and/or dummy controller could include a night light on the face plate which could be controlled by a switch or a light sensor.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Applicant wishes to note that the Applicant: (a) does not intend any of the appended claims to invoke 35 U.S.C. section 112(f) as it exists on the date of filing hereof unless the words "means for" are specifically used in the particular claims; and (b) does not intend by any statement in the specification to limit his invention in any way that is not otherwise reflected in the appended claims.

What is claimed is:

1. A controller system, comprising:
   an electrical junction box;
   a mounting receptacle inserted into and coupled to the junction box;
   a user interface operable to receive input from a user, wherein the user interface comprises an interface housing to which the user interface is coupled, the interface housing having a front portion and a rear portion, the front portion containing the user interface;
   a controller housing coupled to the rear portion of the user interface housing, the controller housing comprised of at least one sidewall and a rear wall;
   at least one magnet coupled to the controller housing, the at least one magnet operable to hold the controller in position using magnetic force when the controller housing is inserted into the mounting receptacle.

2. The controller system of claim 1, wherein the user interface comprises an electronic display.

3. The controller system of claim 1, wherein the user interface comprises a touchscreen.

4. The controller system of claim 1, wherein the user interface comprises a keypad.

5. The controller system of claim 1, wherein the user interface comprises at least one key and an electronic display.

6. The controller system of claim 1, wherein the at least one magnet is glued to the controller housing.

7. The controller system of claim 1, wherein
   the rear wall of the controller housing comprises at least one connector port configured to receive a data communication cable connector.

8. A controller system, comprising:
   a mounting receptacle adapted to be coupled into a junction box;
   a controller, the controller including
     a user interface operable to receive input from a user, wherein the user interface comprises a user interface housing to which the user interface is coupled, the user interface housing having a front portion and a rear portion, the front portion containing the user interface;
     a controller housing coupled to the rear portion of the user interface housing, the controller housing comprised of at least one sidewall and a rear wall;
   at least one magnet coupled to the controller, the at least one magnet operable to hold the controller in position using magnetic force when the controller is inserted into a mounting receptacle; and
   wherein when the controller is inserted into the mounting receptacle, there is a magnetic force between the at least one magnet and the mounting receptacle.

9. The controller system of claim 8, wherein the user interface comprises an electronic display.

10. The controller system of claim 8, wherein the user interface comprises a touchscreen.

11. The controller system of claim 8, wherein the user interface comprises a keypad.

12. The controller system of claim 8, wherein the user interface comprises at least one key and an electronic display.

13. The controller system of claim 8, wherein at least a portion of the mounting receptacle comprises a ferromagnetic material.

14. The controller system of claim 8, wherein the rear wall of the controller housing comprises at least one connector port configured to receive a data communication cable connector.

15. The controller system of claim 8, wherein the controller has a wireless interface to an external device.

16. The controller system of claim 8, wherein the at least one magnet comprises a plurality of magnets, wherein the controller housing has multiple sidewalls, and wherein the at least two of the plurality of magnets are coupled to different ones of the multiple sidewalls.

17. The controller system of claim 8, wherein the mounting receptacle comprises a metal ring made of ferromagnetic metal.

18. The controller system of claim 8, wherein the mounting receptacle comprises at least one piece of ferromagnetic metal coupled to a nonmagnetic material.

19. The controller system of claim 8, wherein the user interface is further operable to provide output to a user.

20. The controller system of claim 8, wherein the mounting receptacle comprises a metal ring made of ferromagnetic metal;
   wherein the at least one magnet comprises a plurality of magnets coupled to one or more sidewalls of the controller housing; and
   wherein the controller housing has a closed back comprising at least one connector port configured to receive a data communication cable connector.

21. The controller system of claim 8, wherein the at least one magnet coupled to the controller has a first polarity, the controller system further comprising:
   at least a second magnet coupled to the mounting receptacle, wherein the second magnet has a second polarity wherein the first and second magnet are operable to hold the controller in position using magnetic force between the first magnet and second magnet when the controller is inserted into the mounting receptacle.

* * * * *